United States Patent [19]

Ikeyama et al.

[11] 4,427,200
[45] Jan. 24, 1984

[54] SEAL STRUCTURE OF END PART OF LIQUID SEPARATION TUBE

[75] Inventors: Norio Ikeyama; Nobuo Sotoma; Shusaku Tamaru, all of Osaka, Japan

[73] Assignee: Nitto Electric Industrial Co., Ltd., Osaka, Japan

[21] Appl. No.: 347,614

[22] Filed: Feb. 10, 1982

[30] Foreign Application Priority Data

Feb. 24, 1981 [JP] Japan .................. 56-26663
Feb. 24, 1981 [JP] Japan .................. 56-26664

[51] Int. Cl.³ .............................. F16J 15/46
[52] U.S. Cl. ................... 277/3; 277/207 A; 277/214; 277/215
[58] Field of Search ............... 277/3, 207 A, 207, 214, 277/215, 34

[56] References Cited

U.S. PATENT DOCUMENTS

| | | | |
|---|---|---|---|
| 2,291,248 | 7/1942 | Myers | 277/3 |
| 3,072,415 | 1/1963 | Lombard et al. | 277/214 |
| 3,147,014 | 9/1964 | Ohnstad | 277/207 A |
| 3,400,937 | 9/1968 | Crankshaw | 277/3 |
| 3,637,222 | 1/1972 | Wilkinson | 277/3 |
| 3,792,834 | 2/1974 | Billeter | 277/215 |
| 3,857,589 | 12/1974 | Oostenbrink | 277/207 A |
| 3,979,130 | 9/1976 | Cowie | 277/207 A |

Primary Examiner—Robert I. Smith
Attorney, Agent, or Firm—Sughrue, Mion, Zinn, Macpeak and Seas

[57] ABSTRACT

A liquid separation tube having a tubular membrane inside of a porous support tube and an end part which is insertable into a coupling member has a seal structure which allows the use of a relatively thin adapter which is to be inserted within a packing. In the seal structure, annular grooves are provided on either the outside circumferential wall of the adapter or the inside circumferential wall of the packing and passages are formed through the adapter in the vicinity of the annular grooves so that a pressurized feed solution can expand the packing in the vicinity of the annular grooves to provide a seal between the packing and the tubular membrane.

10 Claims, 16 Drawing Figures

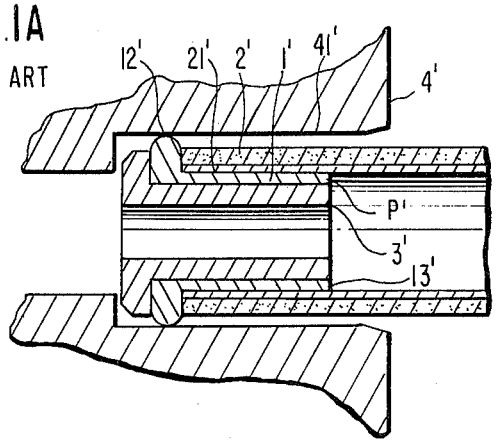
FIG. IA PRIOR ART
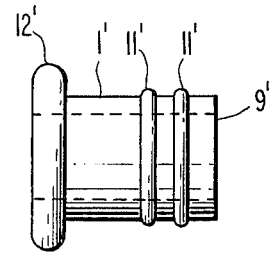
FIG. IB PRIOR ART
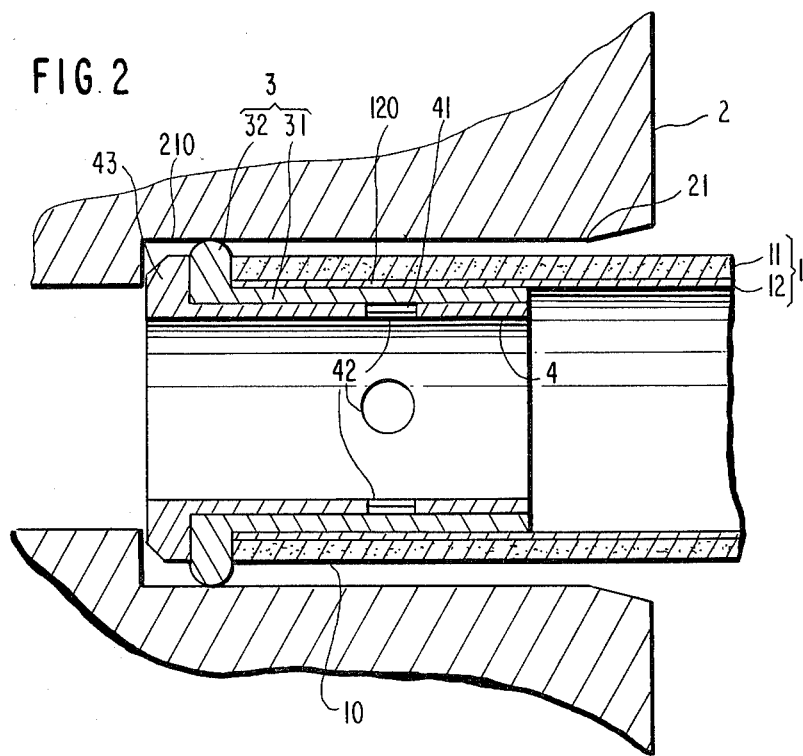
FIG. 2
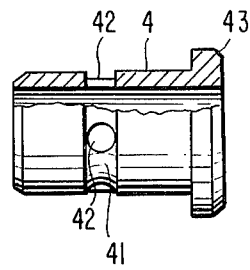
FIG. 3A
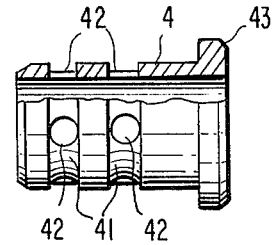
FIG. 3B 4,427,200

SEAL STRUCTURE OF END PART OF LIQUID SEPARATION TUBE

BACKGROUND OF THE INVENTION

1. Field of the Invention

The present invention relates to an improved seal structure for an end part of a liquid separation tube.

2. Description of the Prior Art

A reverse osmotic separation membrane or an ultrafiltration membrane is often used for recovering or separating solvents or solutes by separating the solvents from a feed solution, thereby to increase the concentration of the solutes in the feed solution. In these operations, a tubular membrane separation apparatus of the type wherein the feed solution is passed through the apparatus under pressure has been used as the separating means. In the case of reverse osmotic separation, for example, a pressure of 60 kgf/cm$^2$ is commonly encountered.

In the tubular membrane separation apparatus of this type, a plurality of separation tubes are used with each separation tube having a mechanically strong porous support tube such as a perforated stainless steel tube or a porous FRP tube lined with a tubular membrane. The separation tubes are arranged in parallel and both ends of the separation tubes are fitted with coupling members so that the separation tubes communicate in series or in parallel. Thus, when a feed solution is allowed to pass through the separation tubes under a prescribed pressure, the solvent in the feed solution permeates through the tubular membrane of the separation tubes to flow from the porous support tube, thereby increasing the concentration of the solutes in the feed solution.

In order to interconnect the separation tubes to the input and output apparatus, a seal structure for the ends of the tubes capable of withstanding a high pressure is required. A typical seal of the prior art is shown in U.S. Pat. No. 3,480,147. Such a seal structure is demonstrated in FIGS. 1A and 1B. FIG. 1B shows a packing P' having an annular projection 12' molded on an end of a tubular part 1' having annular projections 11'. As shown in FIG. 1A, the tubular part 1' of the packing P' is inserted into an end part 2' of the separation tube and a tubular adapter 3' having an outside diameter somewhat larger than the inside diameter of the packing P' is then pressed into the packing P' so that the annular projection 12' of the packing P' is pressed against an inside circumferential wall 41' of a passage of the coupling member 4' and the projections 11' are compressed against the interior of the separation tube.

In this seal structure, adapter 3' is required to be thick for insuring close contact between the annular projections 11' at the tubular part 1' of the packing P' and the membrane 21' of the separation tube to produce the desired compressions therebetween as well as for insuring close contact and the desired compression between the annular projection 12' of the packing P' and the inside circumferential wall 41' of the passage of the coupling member pressure. The adapter 3' must also prevent the end part 13' of the tubular part of the packing P' from turning up when a cleaning ball is inserted into the separation tube to remove solid materials attached to the membrane of the separation tube.

In the case of reverse osmotic separation the adapter must be capable of withstanding very high pressure; therefore, it is necessary to remarkably increase the compression ratio of the packing. In addition, the outside diameter of the adapter is required to be rather large as compared with the inside diameter of the packing and the thickness of the adapter is also required to be large in order to withstand a compression stress of the packing. Consequently, the inside diameter of the adapter is small, which results in a large pressure loss as the feed solution passes therethrough. In addition, inserting the adapter into the packing is also difficult. These disadvantages become more severe as the pressure of the feed solution to be processed is increased. Furthermore, since the packing is compressed at a high compression ratio, when the separation apparatus is not operated the packing easily fractures due to fatigue at an early stage of its use.

SUMMARY OF THE INVENTION

In order to avoid the above-described drawbacks, according to the present invention an end part of a liquid separation tube has a "self-seal" structure which utilizes the pressure from the feed solution to aid in forming a seal between a packing and a separation tube membrane.

In accordance with the present invention, a separation tube is equipped with a tubular membrane on the inside of a porous support tube. A packing which has an annular projection molded on an end of the tubular part thereof is provided so as to fit into the separation tube. The packing is resilient and compressible. After the tubular part is inserted into an end of the separation tube, a tubular adapter is inserted into the packing. The end part of the separation tube thus constructed is inserted into a coupling member so that the annular projection of the packing is pressed against an inside circumferential wall of a passage formed between the coupling member and the end part of the separation tube. The geometry of the packing and the adapter are arranged such that fluid from the feed solution contacts and compresses the packing against the interior wall of the separation tube, thus providing a "self-seal" wherein the strength of the seal increases as the pressure of the feed solution increases. In one embodiment, annular grooves are provided on the outside circumferential wall of the tubular adapter and passages are provided through the walls of the adapter for introducing a pressurized feed solution in the vicinity of the grooves to contact the packing and expand the same to create a self-seal. Alternatively, annular grooves can be provided on the inside circumferential wall of the tubular part of the packing; again, passages can be provided in the tubular adapter for introducing the pressurized feed solution into these annular grooves, again causing the packing to expand and create a self-seal.

BRIEF DESCRIPTION OF THE DRAWINGS

FIG. 1A is a view illustrating a prior art seal structure in an end part of a liquid separation tube;

FIG. 1B is a view illustrating a packing used in the prior art seal structure of FIG. 1A;

FIG. 2 is a view showing an end part of the liquid separation tube according to the present invention wherein an adapter has a groove and holes therein;

FIGS. 3A, 3B, 4A and 4B are views illustrating various alternative adapters which can be used in accordance with the present invention;

DETAILED DESCRIPTION OF THE INVENTION

Figure 4A:
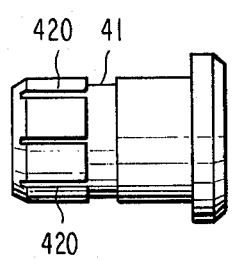

In FIG. 2, a separation tube 1 includes a porous support tube 11 lined with a tubular membrane 12. An end part 10 of the separation tube 1 is inserted into a coupling member 2 and a passage 21 is formed therebetween. A packing 3 of resilient and compressible material comprises an annular projection 32 molded on an end of a tubular part 31. The outside diameter of the tubular part 31 of the packing 3 is equal to or may be somewhat larger than the inside diameter of the separation tube 1. Typically, the thickness of the tubular part 31 is between 0.5 and 1.0 mm while the length thereof is between 1.5 and 3 times the inside diameter of the separation tube 1. The outside diameter of the annular projection 32 is considerably larger than the inside diameter of the passage 21 formed by the coupling member 2 and the separation tube 1.

A tubular adapter 4 made of a plastic or a metal has an outside diameter which is equal to or may be somewhat larger than the inside diameter of the packing 3. The adapter 3 in FIG. 2 has annular grooves 41 provided on the outside circumferential wall thereof. Communicating with the bottom of the grooves 41 are openings 42 as shown in FIGS. 3A and 3B, extending through the wall of the adapter. An annular projection 43 molded on an end of the adapter 4 has an outside diameter which is somewhat smaller than that of the annular projection 32 of the packing 3 and is nearly equal to the outside diameter of the separation tube 1.

To assemble the seal, the tubular part 31 of the above-described packing 3 is inserted into the end part 10 of the separation tube 1 and the adapter 4 is inserted into the packing 3 so that the annular projection 32 of the packing 3 is pressed against the inside circumferential wall 210 of the passage 21 of the coupling member 2. Accordingly, the adapter 4 is compressed adjacent to the annular projection 43. Since the annular projection 43 functions as a reinforcing rib against the compression, the adapter 4 withstands the above-described pressing force even if the thickness of the adapter 4 is reduced. Therefore, it is possible to significantly increase the pressing force between the wall 210 and the annular projection 32, relative to prior assemblies.

In the structure of FIG. 2, when the feed solution is allowed to pass through the separation tube 1 under a high pressure, the high pressure solution is introduced into the annular grooves 41 of the adapter 4 adjacent to with the tubular part 31 of the packing 3 through the openings 42 on the bottom surface of the annular grooves 41. As can be seen, the adapter 4 is enlarged in a radial direction in the vicinity of the annular groove 41 resulting in an increased radial fluid pressure being created in this area. Consequently, the radial fluid pressure expands the packing 3 in the part thereof adjacent to the annular groove 41 of the adapter 4, thus creating a seal between the packing 3 and the membrane 120 of the separation tube 1. This seal is a so-called "self-seal" since the seal is enhanced due to the increased fluid pressure caused by the increased diameter by which a seal corresponding to the pressure of the feed solution can be insured.

Figure 4B:
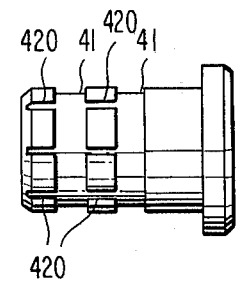
Figure 5:
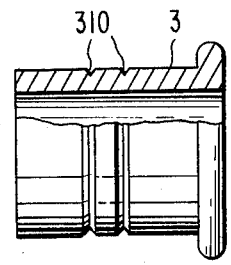
FIG. 5 is a view illustrating an example of another packing which can be used in the present invention.

In the above-described embodiment, the adapter 4 may be modified as shown in FIGS. 4A and 4B so as to have longitudinal grooves 420 rather than the openings 42 for communicating with the above-described annular grooves 41, the longitudinal grooves 420 being provided on the outside circumferential wall of the adapter 4. In this latter embodiment, the above-described feed solution is introduced into the annular grooves 41 through the longitudinal grooves 420. Furthermore, the packing 3 may have notches 310 as shown in FIG. 5 so that the part of the packing facing the annular groove 41 of the adapter 4 is more easily expanded due to the fluid pressure.

In the seal structure of the end part of the liquid separation tube which has the above-described construction, since sealing between the packing and the membrane of the separation tube can be carried out by a self-seal mechanism utilizing the pressure of the feed solution, compression of the packing by the adapter is not required; consequently, it is possible to reduce the thickness of the adapter, thus reducing the pressure loss of the feed solution. Furthermore, since the outside diameter of the adapter is be nearly equal to the inside diameter of the packing, the adapter can be easily inserted into the packing.

Figure 6:
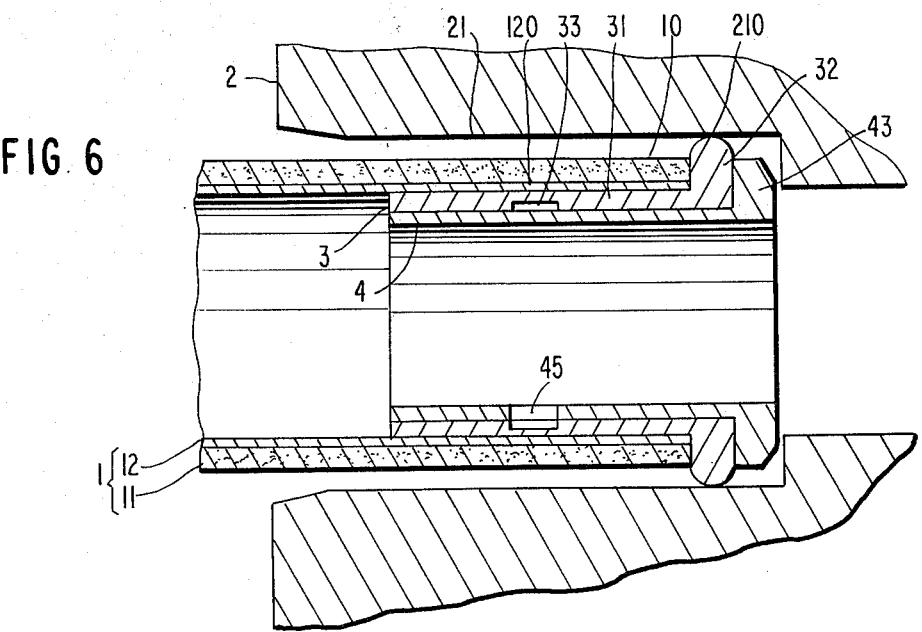
FIGS. 6 and 7 are views which illustrate further embodiments of the present invention wherein a single groove is formed in the packing.
Figure 7:
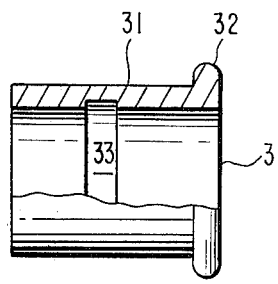
Figure 8:
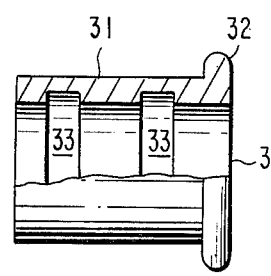
FIG. 8 shows an embodiment wherein two annular grooves are formed in the packing.

A further embodiment of the present invention is shown in FIGS. 6, 7 and 8. In these figures, one or two annular grooves 33 are provided on the inside wall of the tubular part 31 of the packing 3 rather than on the outside wall of the tubular adapter 4.

The tubular adapter 4 of FIG. 6 has openings 45 communicating with the above-described annular grooves 33 of the packing 3. When the packing 3 has a plurality of annular grooves 33 as in FIG. 8, the openings 45 are provided so as to correspond with the annular groove 33. As in the previous embodiments, an annular projection 43 is molded on the end of the adapter 4 and the outside diameter of the projection 43 is somewhat smaller than that of the annular projection 32 of the packing 3, being nearly equal to the outside diameter of the separation tube 1. In addition, the annular projection 32 of the packing 3 is pressed against the inside circumferential wall 210 of the passage of the coupling member 2 upon assembly.

In the embodiment of FIG. 6, the high pressure feed solution is introduced into the annular grooves 33 on the inside wall of the packing 3 through the openings 45 of the adapter 4. Consequently, the packing 3 is compressed at the part of the annular grooves 33 and the sealing between the packing 3 and the membrane 120 of the separation tube 1 is accomplished. This again creates the self-seal wherein the sealing is enhanced since increased fluid pressure results from the increase in diameter in the vicinity of the grooves 33 by which an ideal seal corresponding to the pressure of the feed solution is insured.

Figure 9:
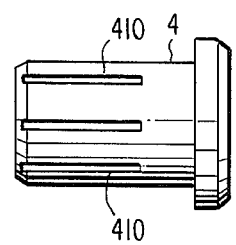
FIGS. 9 and 10A–10D show various alternative adapters which ca be used in the embodiments of FIGS. 6–8.
Figure 10A:
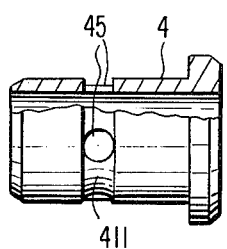
Figure 10B:
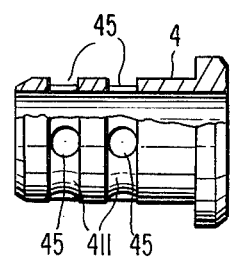
Figure 10C:
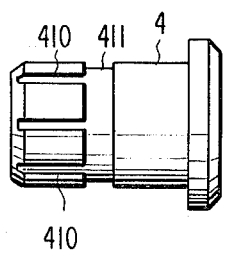
Figure 10D:
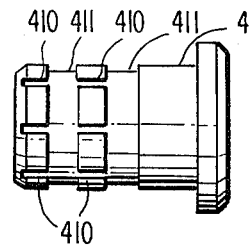

As described above, the openings 45 of the adapter 4 function as passages for introducing the high pressure feed solution into the annular grooves 33 of the packing 3. In place of the openings 45, it is possible to provide longitudinal grooves 410 on the surface of the adapter 4 as shown in FIG. 9. Furthermore, in order to insure smooth circulation of the feed solution in the annular grooves 33 of the packing 3, the adapter 4 may have annular grooves 411 in addition to the above-described openings 45, or the longitudinal grooves 410 as shown in FIGS. 10C–10D.

As can be seen, in the seal structure of FIGS. 6–10, since the sealing between the packing 3 and the membrane 120 of the separation tube 1 can be carried out by the self-seal mechanism utilizing the pressure of the feed solution, compression of the packing by the adapter is not required and therefore it is possible to reduce the thickness of the adapter 4 thus making the pressure loss of the feed solution passing through the adapter small. Furthermore, since the outside diameter of the adapter is reduced so as to be nearly equal to the inside diameter of the packing, the adapter can be easily inserted into the packing.

The invention has been described with respect to specific embodiments and illustrations thereof but obviously is not limited thereto. Changes and variations within the scope of the invention will be readily apparent to those of skill in the art.

We claim:

1. A seal structure for an end part of a liquid separation tube having a tubular membrane inside a porous support tube, said seal structure comprising:
    a packing adapted to be inserted into an end of said liquid separation tube, said packing having a tubular section and an annular projection on the end thereof, said tubular section having an outside diameter equal to or slightly larger than the inside diameter of said separation tube; and
    a tubular adapter adapted to be inserted into said packing and having an outside diameter equal to or slightly larger than the inside diameter of said packing, said adapter having at least one passageway in the wall thereof comunicating with at least one annular groove formed in the outer circumferential wall of said adapter or the inner circumferential wall of said packing,
    whereby when liquid under pressure is passed through said separation tube, the liquid fills said annular groove and compresses said packing against the inside of said separation tube, forming a seal.

2. The seal structure of claim 1, wherein said annular groove is formed in the outer circumferential wall of said adapter.

3. The seal structure of claim 1, wherein said annular groove is formed in the inner circumferential wall of said packing.

4. The seal structure of claims 1, 2 or 3, where said passageway is a circular opening through the wall of said tubular adapter.

5. The seal structure of claims 1, 2 or 3, where said passageway is a longitudinal groove provided on the outside wall of said tubular adapter.

6. The seal structure of claims 1, 2 or 3, wherein a plurality of said annular grooves and a plurality of said passageways are provided.

7. The seal structure claimed in claim 6, wherein said packing has notches on an outside circumferential wall thereof in a section of said tubular part adjacent to said annular grooves.

8. The seal structure claimed in claim 1, 2 or 3, wherein said adapter has an annular projection molded on an end of said adapter, said adapter annular projection being adjacent to said annular projection molded on said end of said packing tubular part and having a smaller outside diameter than that of said packing annular projection.

9. The seal structure claimed in claim 8, wherein said packing tubular part has a thickness between 0.5 and 1.0 mm and a length between 1.5 and 3.0 times the inside diameter of said separation tube.

10. A seal structure for a liquid separation tube assembly, comprising:
    at least one liquid separation tube having a tubular membrane inside a porous separation tube;
    a coupling member adapted to receive the end of said liquid separation tube and to provide a space between the inner diameter of said coupling member and the outer diameter of said liquid separation tube;
    a packing adapted to be inserted into an end of said liquid separation tube, said packing having a tubular section and an annular projection on the end thereof, said annular projection having an outside diameter equal to or larger than the inside diameter of said coupling member and said tubular section having an outside diameter equal to or slightly larger than the inside diameter of said separation tube;
    a tubular adapter adapted to be inserted into said packing having an annular projection on the end thereof, said annular projection having an outside diameter smaller than that of said packing annular projection, the outside diameter of the tubular section of said adapter being equal to or slightly larger than the inside diameter of said packing, said adapter having at least one passageway in the wall thereof communicating with at least one annular groove formed in the outer circumferential wall of said adapter or the inner circumferential wall of said packing,
    whereby when the coupling is pressed against the annular projection on the packing, a seal is formed by the packing annular projection in the space between the coupling and the adapter and when liquid under pressure is passed through said separation tube, the liquid fills said annular groove and compresses said packing against the inside of separation tube, forming a seal.

* * * * *